(Model.)
F. B. NICHOLS.
APPARATUS FOR EVAPORATING OR CONCENTRATING LIQUIDS AND SATURATING LIQUIDS WITH GASES.
No. 265,974.          Patented Oct. 17, 1882.
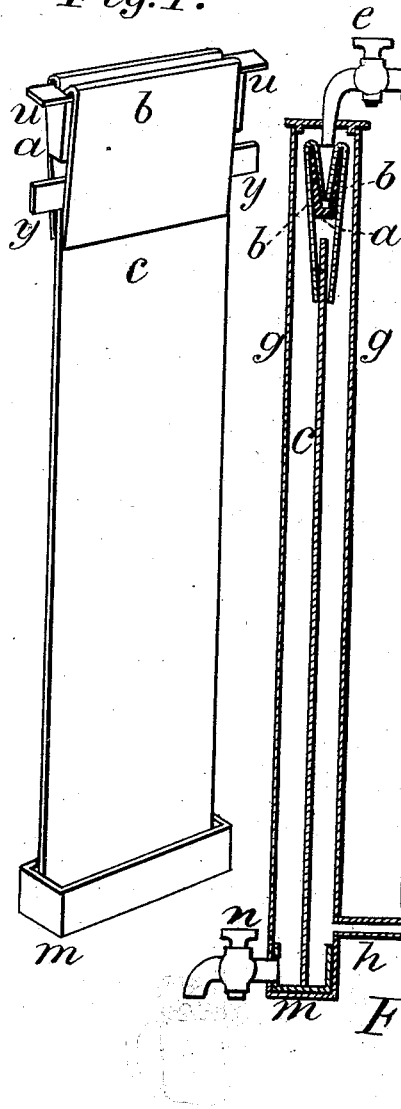
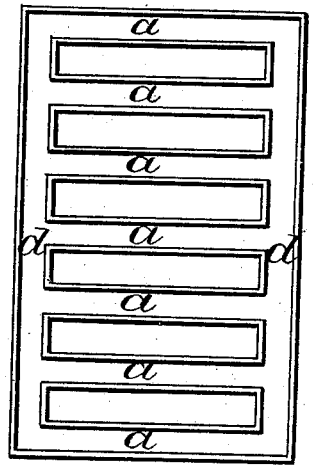
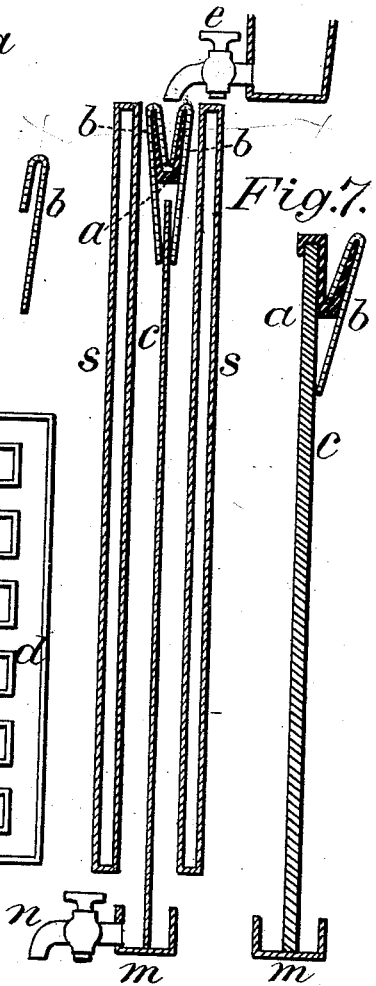
Witnesses:
David Boutilier
Frederick Summers
Inventor.
Frederic Booth Nichols

UNITED STATES PATENT OFFICE.

FREDERIC B. NICHOLS, OF HALIFAX, NOVA SCOTIA, CANADA, ASSIGNOR OF ONE-HALF TO CATHCART THOMSON, OF SAME PLACE.

APPARATUS FOR EVAPORATING OR CONCENTRATING LIQUIDS AND SATURATING LIQUIDS WITH GASES.

SPECIFICATION forming part of Letters Patent No. 265,974, dated October 17, 1882.

Application filed December 12, 1881. (Model.)

*To all whom it may concern:*

Be it known that I, FREDERIC BOOTH NICHOLS, a citizen of the United States, residing at Halifax, in the county of Halifax, Province of Nova Scotia, Dominion of Canada, have invented a new and useful Apparatus for Evaporating or Concentrating Liquids and Absorbing Vapors for Chemical and other Purposes, of which the following is a specification, illustrated in the accompanying drawings, in which—

Figure 1 is a perspective view of a trough, $a$, with its appendages. Fig. 2 is a transverse vertical section of a trough, $a$. Fig. 3 is a transverse vertical section of siphon-slip $b$. Fig. 4 is a transverse vertical section, showing the manner of adjusting the siphon-slips to the troughs and pendulous diffusion-strips below, with receiving-trough $m$, stop-cocks $l$ and $n$ for supplying and drawing off liquid, gas-tight chamber $g\,g$, and gas-pipe $h$. Fig. 5 is a plan showing a number of troughs connected, as shown at $d\,d$, at each side. Fig. 6 is a transverse vertical section, showing the trough with its appendages placed between hot-air flues or steam-pipes S S. Fig. 7 is a modified form of apparatus for using only one side.

The object of my invention is to expose a large surface or surfaces of slowly-moving fluid for the purpose of absorbing gases or vapors in operations usually performed by the Woulfe bottle system, and conversely for the purpose of evaporation, as in the concentration of acids, saline solutions, sirups, &c.

The apparatus for effecting these various results consists of one or more troughs, $a$, for containing the fluid, with a slip, $b$, or slips $b\,b$, styled "siphon-slips" to distinguish them from true siphons, dipping into them and extending down below them for the purpose of conveying the fluid from the trough to the flat surfaces suspended below them. These may be styled "diffusion-strips." These troughs are best when made quite narrow, not exceeding half an inch at the top, and wedge-shaped, with the narrowest edge downward. The depth may be from half an inch to two or more inches, and of any convenient length. The most suitable material for them is glass; but where neither the fluid, gas, nor vapor used is corrosive, metal or other material may be used. The edges or lips of the troughs should be thin and quite uniform both in thickness and height, so as to form a perfect level when placed in position; otherwise much of the fluid will run away in a stream at the lowest point.

The siphon-slips for carrying the fluid over the lips of the troughs and down onto the diffusion-strips below can be made of any thin material that can be bent into the form seen in Fig. 3, provided they are not affected by either the fluid, gas, or vapor used, or by other influences while in use. When it is necessary to use glass to avoid the action of corrosive materials thin sheet-glass can be pressed into proper form when plastic with heat. For most of the purposes to which this apparatus is applied the siphon-slips are fitted, as seen in Figs. 4 and 6, one on each side of the trough, and extending down so as to embrace both sides of the diffusion-strip suspended below. The lugs $u\,u$ of the trough and $y\,y$ of the diffusion-strip should rest on some suitable frame-work or other fixture to hold them in position, or other suitable means may be employed for the same purpose. The siphon-slip should fit the trough uniformly from end to end, but not too tightly. The surfaces of both trough and siphon-slips should be slightly roughened, as polished surfaces do not work satisfactorily. In some cases it may be desirable to granulate either the trough or the siphon-slips, or both trough and slips, in a manner and by means hereinafter to be described. For some purposes the form of trough seen in Fig. 7 may be used, in which only one side of it is fitted with a siphon-slip, and wetting but one side of the diffusion-strip, which in this form may be made stiff enough to support the trough. When the troughs are very long it is more convenient to have the siphon-slips made in sections, instead of one piece reaching from end to end, and when it is necessary to have a small quantity of fluid spread over a very large surface of the diffusion-strips the whole length of the trough need not be filled with the siphon-slips.

The diffusion-strips for receiving and conveying the fluid down to the receiving-trough $m$ below should be thin and present a large amount of surface, and can be formed of any material having the same properties of indestructibility under the conditions required in use as the trough and siphon-slips, and rough or granulated surfaces are of the highest importance for uniformly spreading the fluid while flowing over them. All tendency to greasiness must be avoided when using aqueous solutions, as it will refuse to spread and will run in streaks or drops. The same precaution applies to all parts of the apparatus.

On account of the disposition of all dry surfaces to absorb air, and especially of granular ones to even condense it in its pores, it is necessary for starting the flow to fill the trough to overflowing in order to remove all adherent air from both trough and siphon-slips. When the flow gets properly started by the fluid running down the whole space between trough and slips the slips will act like minute siphons, and if properly constructed will soon empty the trough if no more fluid is supplied to it, carrying it up over the lips of the trough from a depth of an inch or more and down onto the diffusion-strips below. When the trough is kept nearly full, but not overflowing, the flow will be rapid; but the lower the fluid gets in the trough the slower will be the flow, so that the quantity spread over the diffusion-strips can be regulated with the utmost nicety, within all necessary limits, by the quantity supplied to the trough. The fluid may be kept in a tank above and regulated by a stop-cock, $l$, so as to flow in a stream or only in drops, as the nature of the operation may require; or the supply may be regulated by other suitable means.

The granulation is best formed by fine grains of sand cemented to the surfaces of the several parts of the apparatus in such manner as to resemble fine sand-paper in texture. For some purposes a very small grain can be formed by chemically precipitating some insoluble substance or by galvanic precipitation of a metal. The best material for most purposes being glass, the sand-surface can be produced in the following manner: Red lead is mixed into a paint with soluble glass and applied with a brush to the glass, and before it has time to dry fine quartz-sand free from impurities is sifted on and adheres closely to it. When perfectly dry it is to be placed in a properly-arranged furnace and heated to fuse the flux formed by the soluble glass and red lead into the surface of the glass, care being taken not to vitrify the sand. They should then be annealed, and if proper care is taken will have a surface like sand-paper, that will adhere with great tenacity and withstand all chemicals that ordinary glass will. This sand-surface glass has remarkable properties. When once wetted, or the air condensed on it driven off by heat, it is capable of drawing water or other thin fluid to a vertical height of several inches by an action similar to capillary attraction, and one drop placed on it rapidly spreads over a large surface, thus allowing a small quantity of fluid to be uniformly diffused over a very large area, whereas on smooth surfaces it runs down in streaks and away without wetting the other portions at all.

For spontaneous evaporation of weak brines and other weak solutions that are not alkaline, a very good material for the diffusion-strips can be made of stout Manila paper saturated with varnish or melted resin, with sand cemented to the surface by means of the varnish or resin.

When large operations are to be carried on a compound trough can be supplied by one pipe and stop-cock connected together by troughs $d$ $d$ on each side, as seen in Fig. 5, in such manner as to bring the upper edges of the compound trough to the same level, each trough being supplied with siphon-slips and diffusion-strips, as in the single apparatus, and all held in position in a manner to adapt it to the particular use it may be intended for. In this arrangement they can all drain into one receiving-trough large enough to take them all in, said trough or tank having a stop-cock or other means of drawing off the liquid as it collects.

The uses that this apparatus can be applied to are so multifarious that only a few can be mentioned. When used for saturating water with a gas, as in making hydrochloric acid or potential water of ammonia, the water supplied should be quite cold, and the whole apparatus, whether single or combined, should be contained in a gas-tight chamber, $g$ $g$, Fig. 4, and the gas admitted by a pipe, $h$, connecting with a source of supply of the gas that is being used, the flow of water being regulated so as to allow sufficient time for complete saturation before dripping into the receiving-trough $m$, from which it can be drawn off from time to time by the stop-cock $n$. In all cases where the object is to saturate a fluid with a gas or vapor, or to separate one gas from a mixture of gases by means of a fluid having an affinity, by means of any preparation, for the gas to be eliminated, and for some other purposes of a similar nature, it is necessary to have the apparatus contained in a gas or air tight chamber, or one as near to those conditions as possible, and have the inlet and outlet of the fluid so arranged that the gas does not escape through them or air leak in. In most cases where the converse operation is performed, as in concentrating acids, saline solutions, sirups, &c., each trough and its appendages should be placed between hot-air flues or steam-pipes S S, as shown in Fig. 6, when rapid vaporization will go on, and if the quantity of flow is properly regulated sufficient concentration will be effected by the time it reaches the bottom, where it can be drawn off from the receiving-troughs, that may or may not be supplied with stop-cocks, as occasion may require. Where spontaneous evaporation only is required a large number of troughs can be joined together, as previously specified, and the combined apparatus sustained by frame-work that will allow a free passage of air to facilitate vaporization.

For most of the uses to which this apparatus is applied it is desirable to have considerable height, so as to have a long distance for the fluid to run down on the diffusion-strips, and the quantity of fluid fed should for most purposes be only sufficient to moisten the surfaces of the diffusion-strips, without showing any signs of flowing, and only becomes apparent by its collecting in the receiving-trough; but where saline solutions or sirups are being concentrated by placing the apparatus between hot flues or other source of artificial heat a somewhat greater flow will be necessary to keep it from concreting on the diffusion-strips, the concentration not being carried to crystallization, which must be effected after its removal from the receiving-troughs.

I am well aware that wicks have been used to carry fluids over the top or lip of the containing-vessel, and by this means from one vessel to another by means of capillary attraction; but the action of the siphon-slips and granulated surfaces of the diffusion-strips or other parts, though analogous to capillary attraction, is essentially different, being due to what may be called "surface attraction," as exemplified by the disposition of water or other fluids, except mercury, to wet and adhere to most surfaces not protected by a film of condensed air.

Having fully described my invention, what I desire to claim and secure by Letters Patent is—

1. A vessel or trough provided with siphon-slips or thin strips of solid material bent over the edge of said vessel, whereby a continuous flow of liquid out of the vessel may be maintained, as described.

2. The combination of a vessel or trough provided with siphon-slips with diffusion-strips, or broad strips of thin solid material, arranged to maintain a constant flow of liquid over their surfaces, as described.

3. The evaporating apparatus consisting of troughs or vessels provided with siphon-slips, in combination with diffusion-strips, and means for applying heat to one or both sides of said diffusion-strips, substantially as described.

4. The evaporating apparatus composed of a series of troughs, $a$, connected by longitudinal troughs $d$, and provided with siphon-slips and diffusion-strips, substantially as described.

5. An apparatus for saturating liquids with gases or vapors, consisting of a vessel or trough, siphon-slips, and a diffusion strip or strips, in combination with a gas-tight receptacle or chamber having a gas-pipe for supplying gas or vapor and inlet and outlet for fluid, provided with stop-cocks or their equivalents, all in the manner and for the purpose specified.

FREDERIC BOOTH NICHOLS.

Witnesses:
DAVID BOUTILIER,
FREDERICK SUMMERS.